_United States Patent_ [19]

Dreikorn

[11] 4,187,318
[45] Feb. 5, 1980

[54] RODENTICIDAL N-ALKYLDIPHENYLAMINES

[75] Inventor: Barry A. Dreikorn, Indianapolis, Ind.

[73] Assignee: Eli Lilly and Company, Indianapolis, Ind.

[21] Appl. No.: 859,492

[22] Filed: Dec. 12, 1977

Related U.S. Application Data

[63] Continuation-in-part of Ser. No. 706,022, Jul. 21, 1976, abandoned, which is a continuation-in-part of Ser. No. 617,115, Sep. 26, 1975, abandoned.

[51] Int. Cl.$^2$ .................. A01N 9/20; C07C 87/54
[52] U.S. Cl. ..................................... 424/330; 424/84; 424/304; 260/465 E; 260/576
[58] Field of Search .............. 260/576, 465 E; 424/84, 424/330, 304

[56] References Cited

U.S. PATENT DOCUMENTS

| 2,212,825 | 8/1940 | Daudt et al. | 260/571 |
| 3,950,377 | 4/1976 | Barlow | 424/330 |

FOREIGN PATENT DOCUMENTS

| 826376 | 3/1975 | Belgium . |
| 868165 | 5/1961 | United Kingdom . |

_Primary Examiner_—V. D. Turner
_Attorney, Agent, or Firm_—Kathleen R. S. Page; Leroy Whitaker; Arthur R. Whale

[57] ABSTRACT

A series of new diphenylamines have small alkyl substituents on the amino nitrogen. One phenyl ring bears dinitro-trifluoromethyl substitution, and the other is preferably substituted with halogen or pseudo-halogen groups. The new diphenylamines are useful as rodenticides.

79 Claims, No Drawings

RODENTICIDAL N-ALKYLDIPHENYLAMINES

CROSS REFERENCE

This application is a continuation-in-part of my copending application Ser. No. 706,022, filed July 21, 1976, now abandoned, which was a continuation-in-part of then copending application Ser. No. 617,115, filed Sept. 26, 1975, now abandoned.

BACKGROUND OF THE INVENTION

This invention belongs to the rodenticidal art and provides new compounds, methods and compositions for reducing populations of rats or mice.

It has long been known that rats and mice must be controlled. Rats and mice are known carriers of many diseases of which bubonic plague is only the best known. The pestiferous animals also, when sharing the habitations of mankind, soil and contaminate the areas in which they live, and destroy buildings and their contents by their tunneling and nest-building. The animals also consume foodstuffs, and contaminate what they do not consume. A colony of rats in a grain-storage building can consume or destroy substantial amounts of food.

Many kinds of rodenticides have been, and still are, in use. Metallic poisons, such as arsenic and thallium compounds, are still in use, but obviously pose serious hazards to people and useful animals. Organic chemical poisons, of which warfarin is the best known, are in extremely wide use and have served well. However, rodents are developing resistance to such poisons.

Rodenticides are usually presented to rats or mice in the form of mixtures with foodstuffs. The concentration of rodenticide in the mixture is adjusted so that the rodents consume an amount of the rodenticide which is either acutely or chronically lethal. It is advisable not to make the mixture so concentrated that the rodent dies immediately, or even soon after eating. Rodents, and especially rats, are intelligent enough to understand the causal relationship between feeding and death if the time interval is very short. Thus, the best practice is to adjust the concentration of the rodenticide so that the rodents will be poisoned over a number of feedings at the poison bait.

In special circumstances, rodenticides are sometimes mixed in drinking water, or prepared as "tracking powders", which are deposited in runways used by the rodents. After the animals have walked through the loose poison powder, they lick their feet clean and thus ingest the rodenticide.

Tertiary diphenylamines such as those of the present invention have not previously been known. Secondary diphenylamines, however, have been known in the prior art to be fungicides and insecticides. South African Pat. Nos. 73/9415 and 72/1370 are illustrative of the prior art. It will be noted that the prior art does not enable the reader to prepare the present compounds, as will be explained in further detail below. Rodenticidal diphenylamines have not previously been known.

SUMMARY OF THE INVENTION

The present invention provides a series of new rodenticides of the formula

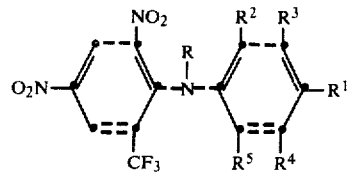

wherein

R represents methyl, ethyl or propyl;

$R^1$ represents hydrogen, fluoro, chloro, bromo, iodo, cyano, methyl, nitro or trifluoromethyl;

$R^2$ and $R^5$ independently represent hydrogen, fluoro, chloro, bromo, nitro, methyl or trifluoromethyl, provided that no more than one of $R^2$ and $R^5$ represents nitro;

$R^3$ and $R^4$ independently represent hydrogen, methyl, fluoro, chloro, bromo or trifluoromethyl;

provided that (a) no more than one of $R^1$, $R^2$, $R^3$, $R^4$ and $R^5$ represents methyl, except that $R^3$ and $R^4$ may both represent methyl;

(b) when $R^1$, $R^2$, $R^3$, $R^4$ or $R^5$ represents methyl or fluoro, two or three of $R^1$, $R^2$ and $R^5$ represent chloro or bromo;

(c) no more than one of $R^1$, $R^2$, $R^3$, $R^4$ and $R^5$ represents trifluoromethyl, except that $R^3$ and $R^4$ may both represent trifluoromethyl;

(d) when $R^2$ or $R^5$ represents trifluoromethyl, $R^1$ represents chloro or bromo;

(e) when one and only one of $R^3$ and $R^4$ represents trifluoromethyl, two or three of $R^1$, $R^2$ and $R^5$ represent chloro or bromo;

(f) no more than four of $R^1$, $R^2$, $R^3$, $R^4$ and $R^5$ represent hydrogen;

(g) two fluorine atoms are not adjacent to each other;

(h) when $R^2$ or $R^5$ represents nitro, $R^1$ represents chloro, bromo or nitro;

(i) when $R^1$, $R^2$, $R^3$, $R^4$ or $R^5$ represents trifluoromethyl, none of $R^1$, $R^2$, $R^3$, $R^4$ and $R^5$ represents fluoro or methyl.

The invention also provides a method of reducing a population of rats or mice which comprises supplying to a locus frequented by the rats or mice a rodenticidal composition which comprises an inert carrier and an effective rodenticidal concentration of a compound described above, and also provides rodenticidal compositions which comprise an inert carrier and a rodenticidally-effective concentration of a compound described above.

DESCRIPTION OF THE PREFERRED EMBODIMENT

All of the compounds below will be named as diphenylamines for the sake of consistency and clarity, even though the rules of nomenclature may call for some compounds to be named otherwise.

All percentages and parts described hereafter refer to percentages and parts by weight, and all temperatures are on the Celsius scale.

The following exemplary compounds are mentioned to assure that the reader fully understands the compounds of this invention. It will be understood that the invention is by no means limited to the compounds named below.

2,6-dibromo-4-chloro-N-methyl-2',4'-dinitro-6'-trifluoromethyldiphenylamine
2-bromo-4-chloro-N-ethyl-2',4'-dinitro-6'-trifluoromethyldiphenylamine
2,4-dichloro-N-methyl-2',4'-dinitro-6'-trifluoromethyldiphenylamine
2,6-dibromo-4-cyano-N-methyl-2',4'-dinitro-6'-trifluoromethyldiphenylamine
2-chloro-2',4'-dinitro-N-propyl-4,6-bis(trifluoromethyl)diphenylamine
N-ethyl-2,6-dibromo-4-iodo-2',4'-dinitro-6'-trifluoromethyldiphenylamine
N-propyl-2,6-dichloro-2',4,4'-trinitro-6'-trifluoromethyldiphenylamine
2-bromo-6-chloro-2',4,4'-trinitro-N-propyl-6'-trifluoromethyldiphenylamine
4-bromo-2-chloro-N-methyl-2',4'-dinitro-6'-trifluoromethyldiphenylamine
2,4-dibromo-6-chloro-N-ethyl-2',4'-dinitro-6'-trifluoromethyldiphenylamine
2-bromo-6-chloro-N-methyl-2',4'-dinitro-4,6'-bis(trifluoromethyl)diphenylamine
2-chloro-N-methyl-2',4,4'-trinitro-6'-trifluoromethyldiphenylamine
2,6-dibromo-4-ido-N-methyl-2',4'-dinitro-6'-trifluoromethyldiphenylamine
N-methyl-2,4,6-trichloro-2',4'-dinitro-6'-trifluoromethyldiphenylamine
2,6-dibromo-N-methyl-2',4,4'-trinitro-6'-trifluoromethyldiphenylamine
N-ethyl-2-bromo-2',4'-dinitro-4,6'-bis(trifluoromethyl)diphenylamine
2,6-dibromo-4-cyano-2',4'-dinitro-N-propyl-6'-trifluoromethyldiphenylamine
2,4,6-trichloro-2',4'-dinitro-N-propyl-6'-trifluoromethyldiphenylamine
2,6-dibromo-4-chloro-N-ethyl-2',4'-dinitro-6'-trifluoromethyldiphenylamine
2,6-dichloro-N-ethyl-2',4'-dinitro-4,6'-bis(trifluoromethyl)diphenylamine
2,6-dibromo-N-methyl-2',4'-dinitro-4,6'-bis(trifluoromethyl)diphenylamine
2-chloro-4-iodo-N-methyl-2',4'-dinitro-6'-trifluoromethyldiphenylamine
2,6-dichloro-4-cyano-N-ethyl-2',4'-dinitro-6'-trifluoromethyldiphenylamine
2,4-dibromo-2',4'-dinitro-N-propyl-6'-trifluoromethyldiphenylamine
4-bromo-2-chloro-N-ethyl-2',4'-dinitro-6'-trifluoromethyldiphenylamine
2-chloro-4-cyano-N-methyl-2',4'-dinitro-6'-trifluoromethyldiphenylamine
2-bromo-N-ethyl-2',4,4'-trinitro-6'-trifluoromethyldiphenylamine
2-chloro-4-iodo-2',4'-dinitro-N-propyl-6'-trifluoromethyldiphenylamine
2,6-dichloro-N-ethyl-2',4,4'-trinitro-6'-trifluoromethyldiphenylamine
2-bromo-4,6-dichloro-N-ethyl-2',4'-dinitro-6'-trifluoromethyldiphenylamine
2-bromo-6-chloro-4-cyano-2',4'-dinitro-N-propyl-6'-trifluoromethyldiphenylamine
2,6-dichloro-N-ethyl-4-iodo-2',4'-dinitro-6'-trifluoromethyldiphenylamine
N-ethyl-2,6-dibromo-4-chloro-2',4'-dinitro-6'-trifluoromethyldiphenylamine
2-chloro-4-cyano-2',4'-dinitro-N-propyl-6'-trifluoromethyldiphenylamine
2-bromo-4-chloro-N-methyl-2',4'-dinitro-6'-trifluoromethyldiphenylamine
2-chloro-2',4,4'-trinitro-N-propyl-6'-trifluoromethyldiphenylamine
2-bromo-N-ethyl-2',4'-dinitro-4,6'-bis(trifluoromethyl)diphenylamine
2-bromo-N-ethyl-4-iodo-2',4'-dinitro-6'-trifluoromethyldiphenylamine
2,4-dichloro-N-ethyl-2',4'-dinitro-6'-trifluoromethyldiphenylamine
2,4,6-tribromo-N-ethyl-2',4'-dinitro-6'-trifluoromethyldiphenylamine
N-propyl-2-bromo-4-cyano-2',4'-dinitro-6'-trifluoromethyldiphenylamine
N-ethyl-2,6-dichloro-2',4'-dinitro-4,6'-bis(trifluoromethyl)diphenylamine
2-chloro-N-methyl-2',4'-dinitro-4,6'-bis(trifluoromethyl)diphenylamine
N-methyl-2-bromo-4-iodo-2',4'-dinitro-6'-trifluoromethyldiphenylamine
2-bromo-4,6-dichloro-N-methyl-2',4'-dinitro-6'-trifluoromethyldiphenylamine
2-bromo-6-chloro-4-cyano-N-methyl-2',4'-dinitro-6'-trifluoromethyldiphenylamine
4-cyano-N-methyl-2',4'-dinitro-6'-trifluoromethyldiphenylamine
2-bromo-4-chloro-2',4'-dinitro-N-propyl-6'-trifluoromethyldiphenylamine
N-ethyl-2',4,4'-trinitro-6'-trifluoromethyldiphenylamine
N-methyl-2-bromo-2',4,4'-trinitro-6'-trifluoromethyldiphenylamine
2,6-dichloro-4-iodo-2',4'-dinitro-N-propyl-6'-trifluoromethyldiphenylamine
2-bromo-6-chloro-N-methyl-2',4,4'-trinitro-6'-trifluoromethyldiphenylamine
N-propyl-4-bromo-2-chloro-2',4'-dinitro-6'-trifluoromethyldiphenylamine
4-bromo-2,6-dichloro-2',4'-dinitro-N-propyl-6'-trifluoromethyldiphenylamine
2,6-dibromo-2',4,4'-trinitro-N-propyl-6'-trifluoromethyldiphenylamine
2-bromo-6-chloro-4-iodo-N-methyl-2',4'-dinitro-6'-trifluoromethyldiphenylamine
N-ethyl-2,6-dichloro-4-cyano-2',4'-dinitro-6'-trifluoromethyldiphenylamine
4-bromo-2,6-dichloro-N-methyl-2',4'-dinitro-6'-trifluoromethyldiphenylamine
N-propyl-2,4-dibromo-2',4'-dinitro-6'-trifluoromethyldiphenylamine
2-bromo-6-chloro-N-ethyl-4-iodo-2',4'-dinitro-6'-trifluoromethyldiphenylamine
2-bromo-4-cyano-N-ethyl-2',4'-dinitro-6'-trifluoromethyldiphenylamine
2,4-dibromo-6-chloro-2',4'-dinitro-N-propyl-6'-trifluoromethyldiphenylamine
2,4-dibromo-2',4'-dinitro-N-propyl-6'-trifluoromethyldiphenylamine
2-bromo-4-chloro-6,N-dimethyl-2',4'-dinitro-6'-trifluoromethyldiphenylamine
2,4-dichloro-3-methyl-2',4'-dinitro-N-propyl-6'-trifluoromethyldiphenylamine
2,4-dibromo-2',4'-dinitro-N-propyl-6,6'-bis(trifluoromethyl)diphenylamine
4-bromo-2-chloro-N-ethyl-2',4'-dinitro-6,6'-bis(trifluoromethyl)diphenylamine
2,6-dichloro-4,N-dimethyl-2',4'-dinitro-6'-trifluoromethyldiphenylamine 2-bromo-4,6-dichloro-N-methyl-2',4'-dinitro-3,6'-bis(trifluoromethyl)diphenylamine
2,4,6-trichloro-3,N-dimethyl-2',4'-dinitro-6'-trifluoromethyldiphenylamine
2,4-dibromo-N-ethyl-6-methyl-2',4'-dinitro-6'-trifluoromethyldiphenylamine
4-bromo-2-chloro-2',4'-dinitro-N-propyl-3,6'-bis(trifluoromethyl)diphenylamine
2,6-dibromo-2',4'-dinitro-N-propyl-4,6'-bis(trifluoromethyl)diphenylamine
N-ethyl-2,4-dinitro-3',5',6-tris(trifluoromethyl)diphenylamine
2,4,6-tribromo-N-ethyl-3-methyl-2',4'-dinitro-6'-trifluoromethyldiphenylamine
2,6-dibromo-4-chloro-N-ethyl-2',4'-dinitro-3,6'-bis(trifluoromethyl)diphenylamine
4-bromo-2,6-dichloro-N-ethyl-3-methyl-2',4'-dinitro-6'-trifluoromethyldiphenylamine
2,6-dibromo-N-ethyl-4-methyl-2',4'-dinitro-6'-trifluoromethyldiphenylamine
2-bromo-4-chloro-2',4'-dinitro-N-propyl-6,6'-bis(trifluoromethyl)diphenylamine
2-bromo-6-chloro-3,N-dimethyl-2',4'-dinitro-6'-trifluoromethyldiphenylamine
2-bromo-4,6-dichloro-3-methyl-2',4'-dinitro-N-propyl-6'-trifluoromethyldiphenylamine
4-bromo-2-chloro-5,N-dimethyl-2',4'-dinitro-6'-trifluoromethyldiphenylamine
4-bromo-2,6-dichloro-N-methyl-2',4'-dinitro-3,6'-bis(trifluoromethyl)diphenylamine
2-bromo-6-chloro-N-ethyl-2',4'-dinitro-4,6'-bis(trifluoromethyl)diphenylamine
2,4-dichloro-N-methyl-2',4'-dinitro-3,6'-bis(trifluoromethyl)diphenylamine
2,4-dibromo-3-methyl-2',4'-dinitro-N-propyl-6'-trifluoromethyldiphenylamine
4-bromo-2-chloro-6,N-dimethyl-2',4'-dinitro-6'-trifluoromethyldiphenylamine
2,4-dibromo-N-ethyl-2',4'-dinitro-3,6'-bis(trifluoromethyl)diphenylamine
2,4,6-tribromo-2',4'-dinitro-N-propyl-3,6'-bis(trifluoromethyl)diphenylamine
2-bromo-4-chloro-N-ethyl-3-methyl-2',4'-dinitro-6'-trifluoromethyldiphenylamine
2,4,6-trichloro-N-ethyl-2',4'-dinitro-3,6'-bis(trifluoromethyl)diphenylamine
2,6-dibromo-4-chloro-3-methyl-2',4'-dinitro-N-propyl-6'-trifluoromethyldiphenylamine
2-bromo-4-chloro-N-methyl-2',4'-dinitro-3,6'-bis(trifluoromethyl)diphenylamine
2,6-dichloro-2',4'-dinitro-N-propyl-4,6'-bis(trifluoromethyl)diphenylamine
2,4-dibromo-3,5-dimethyl-2',4'-dinitro-N-propyl-6'-trifluoromethyldiphenylamine
2,6-dichloro-3,5,N-trimethyl-2',4'-dinitro-6'-trifluoromethyldiphenylamine
2-bromo-4-chloro-N-ethyl-3,5-dimethyl-2',4'-dinitro-6'-trifluoromethyldiphenylamine
4-bromo-2-chloro-3,5,N-trimethyl-2',4'-dinitro-6'-trifluoromethyldiphenylamine
4-bromo-N-methyl-2',4'-dinitro-3,5,6'-tris(trifluoromethyl)diphenylamine
2,4,6-trichloro-2',4'-dinitro-N-propyl-3,5,6'-tris(trifluoromethyl)diphenylamine
2,4-dibromo-N-ethyl-2',4'-dinitro-3,5,6'-tris(trifluoromethyl)diphenylamine
2,6-dibromo-4-chloro-N-ethyl-2',4'-dinitro-3,5,6'-tris(trifluoromethyl)diphenylamine
2,4,6-tribromo-3,5N-trimethyl-2',4'-dinitro-6'-trifluoromethyldiphenylamine
4-chloro-N-ethyl-2',4'-dinitro-2,6'-bis(trifluoromethyl)diphenylamine
4-bromo-2',4'-dinitro-N-propyl-2,6'-bis(trifluoromethyl)diphenylamine
2,6-dibromo-N-ethyl-3-methyl-2',4,4'-trinito-6'-trifluoromethyldiphenylamine
2-bromo-6-chloro-3,N-dimethyl-2',4,4'-trinitro-6'-trifluoromethyldiphenylamine
2,6-dichloro-N-ethyl-3-methyl-2',4,4'-trinitro-6'-trifluoromethyldiphenylamine
2,6-dibromo-4-cyano-3-methyl-2',4'-dinitro-N-propyl-6'-trifluoromethyldiphenylamine
2-bromo-6-chloro-4-cyano-N-ethyl-3-methyl-2',4'-dinitro-6'-trifluoromethyldiphenylamine
2,6-dichloro-4-cyano-3,N-dimethyl-2',4'-dinitro-6'-trifluoromethyldiphenylamine
2-bromo-6-chloro-2',4'-dinitro-N-propyl-4,6'-bis(trifluoromethyl)diphenylamine
2,6-dibromo-N-ethyl-2',4'-dinitro-4,6'-bis(trifluoromethyl)diphenylamine
2,6-dichloro-N-ethyl-2',4'-dinitro-4,6'-bis(trifluoromethyl)diphenylamine
2,6-dibromo-N-methyl-2',4,4'-trinitro-3,6'-bis(trifluoromethyl)diphenylamine
2-bromo-6-chloro-N-ethyl-2',4,4'-trinitro-3,6'-bis(trifluoromethyl)diphenylamine
2,6-dibromo-4-cyano-N-ethyl-2',4'-dinitro-3,6'-bis(trifluoromethyl)diphenylamine
2-bromo-6-chloro-2',4,4'-trinitro-N-propyl-3,6'-bis(trifluoromethyl)diphenylamine
2,3,5-trichloro-N-methyl-2',4,4',6-tetranitro-6'-trifluoromethyldiphenylamine
4-bromo-N-ethyl-2,2',4'-trinitro-6'-trifluoromethyldiphenylamine
4-chloro-2,2',4'-trinitro-N-propyl-6'-trifluoromethyldiphenylamine
2,4-dibromo-N-ethyl-2',4',6-trinitro-5,6'-bis(trifluoromethyl)diphenylamine
4-bromo-2-chloro-N-methyl-2',4',6-trinitro-6'-trifluoromethyldiphenylamine
2,3,4,5,6-pentachloro-N-methyl-2',4'-dinitro-6'-trifluoromethyldiphenylamine
2,3,4,5,6-pentabromo-N-ethyl-2',4'-dinitro-6'-trifluoromethyldiphenylamine
4-bromo-2,5,6-trichloro-3-fluoro-2',4'-dinitro-N-propyl-6'-trifluoromethyldiphenylamine
2,3,5,6-tetrabromo-4-fluoro-N-methyl-2',4'-dinitro-6'-trifluoromethyldiphenylamine
4-bromo-2,3,5,6-tetrachloro-N-methyl-2',4'-dinitro-6'-trifluoromethyldiphenylamine
3,5-dibromo-2,4,6-trichloro-2',4'-dinitro-N-propyl-6'-trifluoromethyldiphenylamine
2,3,5,6-tetrachloro-N-ethyl-4-iodo-2',4'-dinitro-6'-trifluoromethyldiphenylamine
2,4,6-tribromo-3,5-dichloro-N-methyl-2',4'-dinitro-6'-trifluoromethyldiphenylamine
2,3,4,6-tetrachloro-N-ethyl-5-fluoro-2',4'-dinitro-6'-trifluoromethyldiphenylamine
3-bromo-2,4,5,6-tetrachloro-N-methyl-2',4'-dinitro-6'-trifluoromethyldiphenylamine
2,3,6-tribromo-5-fluoro-4-iodo-2',4'-dinitro-N-propyl-6'-trifluoromethyldiphenylamine
2,3,4,5-tetrachloro-6-fluoro-N-methyl-2',4'-dinitro-6'-trifluoromethyldiphenylamine
2,3,4,6-tetrachloro-N-ethyl-2',4'-dinitro-6'-trifluoromethyldiphenylamine 2,3,5,6-tetrabromo-2',4'-dinitro-N-propyl-6'-trifluoromethyldiphenylamine
2,6-dibromo-3,5-dichloro-N-ethyl-2',4'-dinitro-6'-trifluoromethyldiphenylamine
2,3,4-tribromo-6-fluoro-N-methyl-2',4'-dinitro-6'-trifluoromethyldiphenylamine
2,3,4-trichloro-N-ethyl-5-fluoro-2',4'-dinitro-6'-trifluoromethyldiphenylamine
2,6-dibromo-4-fluoro-N-methyl-2',4'-dinitro-6'-trifluoromethyldiphenylamine
2,4-dichloro-3-fluoro-2',4'-dinitro-N-propyl-6'-trifluoromethyldiphenylamine
2-bromo-4-chloro-6-fluoro-N-methyl-2',4'-dinitro-6'-trifluoromethyldiphenylamine
2,6-dibromo-3-fluoro-4-iodo-2',4'-dinitro-N-propyl-6'-trifluoromethyldiphenylamine
2,3,6-trichloro-4-fluoro-N-methyl-2',4'-dinitro-6'-trifluoromethyldiphenylamine
2-chloro-N-methyl-2',4'-dinitro-6'-trifluoromethyldiphenylamine
3-bromo-N-methyl-2',4'-dinitro-6'-trifluoromethyldiphenylamine
2,6-dichloro-4-fluoro-2',4'-dinitro-N-propyl-6'-trifluoromethyldiphenylamine
2,4,6-trichloro-N-ethyl-3-fluoro-2',4'-dinitro-6'-trifluoromethyldiphenylamine
4-bromo-2,6-dichloro-3-fluoro-N-methyl-2',4'-dinitro-6'-trifluoromethyldiphenylamine
2,4-dibromo-N-ethyl-6-fluoro-2',4'-dinitro-6'-trifluoromethyldiphenylamine
2,6-dichloro-4-cyano-3-fluoro-N-methyl-2',4'-dinitro-6'-trifluoromethyldiphenylamine
4-bromo-N-ethyl-2',4'-dinitro-2,6'-bis(trifluoromethyl)-diphenylamine
4-cyano-N-methyl-2',4'-dinitro-6'-trifluoromethyldiphenylamine
2,6-dichloro-3-fluoro-N,4-dimethyl-2',4'-dinitro-6'-trifluoromethyldiphenylamine
2,4-dibromo-3-chloro-N-methyl-2',4'-dinitro-6,6'-bis(trifluoromethyl)diphenylamine
2,4,4'-trinitro-N-propyl-6-trifluoromethyldiphenylamine
3,4-dichloro-6'-trifluoromethyldiphenylamine
2,6-dichloro-3-fluoro-N-methyl-2',4,4'-trinitro-6'-trifluoromethyldiphenylamine
4-iodo-N-methyl-2',4'-dinitro-6'-trifluoromethyldiphenylamine
4-bromo-N-methyl-2',4'-dinitro-3,5,6'-tris(trifluoromethyl)diphenylamine
2,6-dichloro-N-ethyl-3-bromo-2',4'-dinitro-4,6'-bis(trifluoromethyl)diphenylamine
3,5-dibromo-N-methyl-2',4'-dinitro-6'-trifluoromethyldiphenylamine
2-bromo-4-chloro-6-fluoro-N,3-dimethyl-2',4'-dinitro-6'-trifluoromethyldiphenylamine
2,6-dichloro-N-methyl-2',4'-dinitro-3,5,6'-tris(trifluoromethyl)diphenylamine
N-methyl-2,4-dinitro-4',6-bis(trisfluoromethyl)diphenylamine
4-chloro-N-methyl-2',4'-dinitro-6'-trifluoromethyldiphenylamine
4-bromo-2-chloro-N-ethyl-6-methyl-2',4'-dinitro-6'-trifluoromethyldiphenylamine
3,5-dibromo-2-chloro-N-methyl-2',4'-dinitro-6'-trifluoromethyldiphenylamine
2,4-dichloro-N-ethyl-3-methyl-2',4',6-trinitro-6'-trifluoromethyldiphenylamine
2,3,4-tribromo-5-fluoro-2',4',6-trinitro-N-propyl-6'-trifluoromethyldiphenylamine
2,2',4,4'-tetranitro-N-propyl-6'-trifluoromethyldiphenylamine
2,4,6-trichloro-3,5-difluoro-N-methyl-2',4'-dinitro-6'-trifluoromethyldiphenylamine
2,4-dibromo-6-chloro-N-ethyl-3,5-difluoro-2',4'-dinitro-6'-trifluoromethyldiphenylamine
2,4-dibromo-3,5-dichloro-N-methyl-2',4'-dinitro-6,6'-bis(trifluoromethyl)diphenylamine
2,4-dichloro-N-ethyl-3,5-difluoro-2',4',6-trinitro-6'-trifluoromethyldiphenylamine
4-bromo-2-chloro-3,5-difluoro-6-methyl-2',4'-dinitro-N-propyl-6'-trifluoromethyldiphenylamine
2,6-dibromo-3,5-difluoro-N-methyl-2',4'-dinitro-6'-trifluoromethyldiphenylamine
2,4-dichloro-N-ethyl-3,5-difluoro-2',4'-dinitro-6'-trifluoromethyldiphenylamine
2,6-dichloro-3,5-difluoro-4-iodo-N-methyl-2',4'-dinitro-6'-trifluoromethyldiphenylamine
2,6-dichloro-4-cyano-N-ethyl-3,5-difluoro-2',4'-dinitro-6'-trifluoromethyldiphenylamine
2,6-dibromo-3,5-difluoro-2',4,4'-trinitro-N-propyl-6'-trifluoromethyldiphenylamine
2,4-dichloro-3,6-difluoro-N-methyl-2',4'-dinitro-6'-trifluoromethyldiphenylamine
2-bromo-4-chloro-3,6-difluoro-2',4'-dinitro-N-propyl-6'-trifluoromethyldiphenylamine
4-bromo-2-chloro-N-methyl-2',4'-dinitro-6,6'-bis(trifluoromethyl)diphenylamine
2,4-dibromo-N-ethyl-6-methyl-2',4'-dinitro-6'-trifluoromethyldiphenylamine
4-bromo-2',4'-dinitro-N-propyl-6'-trifluoromethyldiphenylamine
2,4-dibromo-N-ethyl-2',4'-dinitro-6,6'-bis(trifluoromethyl)diphenylamine
3,4-dibromo-N-methyl-2',4'-dinitro-6'-trifluoromethyldiphenylamine The following are the preferred compounds of this invention.
2,4,6-trichloro-N-ethyl-2',4'-dinitro-6'-trifluoromethyldiphenylamine
2,4,6-trichloro-N-methyl-2',4'-dinitro-6'-trifluoromethyldiphenylamine
2,4-dibromo-N-methyl-2',4'-dinitro-6'-trifluoromethyldiphenylamine
2,4-dibromo-6-chloro-N-methyl-2',4'-dinitro-6'-trifluoromethyldiphenylamine
2,4,6-tribromo-N-methyl-2',4'-dinitro-6'-trifluoromethyldiphenylamine
N-methyl-2,4-dinitro-3',5',6-tris(trifluoromethyl)diphenylamine
2,6-dibromo-4-chloro-N-methyl-2',4'-dinitro-6'-trifluoromethyldiphenylamine
4-bromo-2,6-dichloro-N-methyl-2',4'-dinitro-6'-trifluoromethyldiphenylamine It will be understood that the present invention may be practiced in a number of different ways, making use of different types or classes of compounds. For example, the following classes of compounds of the invention are contemplated, as new compounds, for use in the method and as components of the rodenticidal compositions of the invention. Each numbered subparagraph below describes an independent class of compounds of the invention; in each class, the variable substituents have the general meanings above if not otherwise stated.

Compounds wherein:

1. R represents ethyl or methyl;
2. R represents methyl;
3. $R^1$ represents hydrogen, fluoro, chloro, bromo, iodo, cyano, nitro or trifluoromethyl;
4. $R^1$ represents hydrogen, fluoro, chloro, bromo, iodo, methyl, nitro or trifluoromethyl;
5. $R^1$ represents fluoro, chloro, bromo, iodo, cyano, methyl, nitro or trifluoromethyl;
6. $R^1$ represents hydrogen, fluoro, chloro, bromo, nitro or trifluoromethyl;
7. $R^1$ represents hydrogen, fluoro, chloro, bromo or trifluoromethyl;
8. $R^1$ represents hydrogen, chloro or bromo;
9. $R^2$ and $R^5$ independently represent hydrogen, fluoro, chloro, bromo or nitro;
10. $R^2$ and $R^5$ independently represent hydrogen, fluoro, bromo, chloro, nitro or trifluoromethyl;
11. $R^2$ and $R^5$ independently represent hydrogen, chloro, bromo or fluoro;
12. $R^3$ and $R^4$ independently represent hydrogen, fluoro, chloro, bromo or methyl;
13. $R^3$ and $R^4$ independently represent hydrogen, fluoro, chloro, bromo or trifluoromethyl;
14. $R^3$ and $R^4$ independently represent hydrogen, chloro, bromo or fluoro;
15. compounds of subparagraphs 1 and 3;
16. compounds of subparagraphs 1 and 4;
17. compounds of subparagraphs 1 and 5;
18. compounds of subparagraphs 1 and 6;
19. compounds of subparagraphs 1 and 7;
20. compounds of subparagraphs 1 and 8;
21. compounds of subparagraphs 2 and 3;
22. compounds of subparagraphs 2 and 4;
23. compounds of subparagraphs 2 and 5;
24. compounds of subparagraphs 2 and 6;
25. compounds of subparagraphs 2 and 7;
26. compounds of subparagraphs 2 and 8;
27. compounds of subparagraphs 1 and 9;
28. compounds of subparagraphs 1 and 10;
29. compounds of subparagraphs 1 and 11;
30. compounds of subparagraphs 2 and 9;
31. compounds of subparagraphs 2 and 10;
32. compounds of subparagraphs 2 and 11;
33. compounds of subparagraphs 1 and 12;
34. compounds of subparagraphs 1 and 13;
35. compounds of subparagraphs 1 and 14;
36. compounds of subparagraphs 2 and 12;
37. compounds of subparagraphs 2 and 13;
38. compounds of subparagraphs 2 and 14;
39. compounds of subparagraphs 3 and 9;
40. compounds of subparagraphs 3 and 10;
41. compounds of subparagraphs 3 and 11;
42. compounds of subparagraphs 4 and 9;
43. compounds of subparagraphs 4 and 10;
44. compounds of subparagraphs 4 and 11;
45. compounds of subparagraphs 5 and 9;
46. compounds of subparagraphs 5 and 10;
47. compounds of subparagraphs 5 and 11;
48. compounds of subparagraphs 6 and 9;
49. compounds of subparagraphs 6 and 10;
50. compounds of subparagraphs 6 and 11;
51. compounds of subparagraphs 7 and 9;
52. compounds of subparagraphs 7 and 10;
53. compounds of subparagraphs 7 and 11;
54. compounds of subparagraphs 8 and 9;
55. compounds of subparagraphs 8 and 10;
56. compounds of subparagraphs 8 and 11;
57. compounds of subparagraphs 3 and 12;
58. compounds of subparagraphs 3 and 13;
59. compounds of subparagraphs 3 and 14;
60. compounds of subparagraphs 4 and 12;
61. compounds of subparagraphs 4 and 13;
62. compounds of subparagraphs 4 and 14;
63. compounds of subparagraphs 5 and 12;
64. compounds of subparagraphs 5 and 13;
65. compounds of subparagraphs 5 and 14;
66. compounds of subparagraphs 6 and 12;
67. compounds of subparagraphs 6 and 13;
68. compounds of subparagraphs 6 and 14;
69. compounds of subparagraphs 7 and 12;
70. compounds of subparagraphs 7 and 13;
71. compounds of subparagraphs 7 and 14;
72. compounds of subparagraphs 8 and 12;
73. compounds of subparagraphs 8 and 13;
74. compounds of subparagraphs 8 and 14;
75. compounds of subparagraphs 9 and 12;
76. compounds of subparagraphs 9 and 13;
77. compounds of subparagraphs 9 and 14;
78. compounds of subparagraphs 10 and 12;
79. compounds of subparagraphs 10 and 13;
80. compounds of subparagraphs 10 and 14;
81. compounds of subparagraphs 11 and 12;
82. compounds of subparagraphs 11 and 13;
83. compounds of subparagraphs 11 and 14;
84. compounds of subparagraphs 1, 3 and 9;
85. compounds of subparagraphs 1, 3 and 10;
86. compounds of subparagraphs 1, 3 and 11;
87. compounds of subparagraphs 1, 4 and 9;
88. compounds of subparagraphs 1, 4 and 10;
89. compounds of subparagraphs 1, 4 and 11;
90. compounds of subparagraphs 1, 5 and 9;
91. compounds of subparagraphs 1, 5 and 10;
92. compounds of subparagraphs 1, 5 and 11;
93. compounds of subparagraphs 1, 6 and 9;
94. compounds of subparagraphs 1, 6 and 10;
95. compounds of subparagraphs 1, 6 and 11;
96. compounds of subparagraphs 1, 7 and 9;
97. compounds of subparagraphs 1, 7 and 10;
98. compounds of subparagraphs 1, 7 and 11;
99. compounds of subparagraphs 1, 8 and 9;
100. compounds of subparagraphs 1, 8 and 10;
101. compounds of subparagraphs 1, 8 and 11;
102. compounds of subparagraphs 2, 3 and 9;
103. compounds of subparagraphs 2, 3 and 10;
104. compounds of subparagraphs 2, 3 and 11;
105. compounds of subparagraphs 2, 4 and 9;
106. compounds of subparagraphs 2, 4 and 10;
107. compounds of subparagraphs 2, 4 and 11;
108. compounds of subparagraphs 2, 5 and 9;
109. compounds of subparagraphs 2, 5 and 10;
110. compounds of subparagraphs 2, 5 and 11;
111. compounds of subparagraphs 2, 6 and 9;
112. compounds of subparagraphs 2, 6 and 10;
113. compounds of subparagraphs 2, 6 and 11;
114. compounds of subparagraphs 2, 7 and 9;
115. compounds of subparagraphs 2, 7 and 10;
116. compounds of subparagraphs 2, 7 and 11;
117. compounds of subparagraphs 2, 8 and 9;
118. compounds of subparagraphs 2, 8 and 10;
119. compounds of subparagraphs 2, 8 and 11;
120. compounds of subparagraphs 1, 3 and 12;
121. compounds of subparagraphs 1, 3 and 13;
122. compounds of subparagraphs 1, 3 and 14;
123. compounds of subparagraphs 1, 4 and 12;
124. compounds of subparagraphs 1, 4 and 13;
125. compounds of subparagraphs 1, 4 and 14;

126. compounds of subparagraphs 1, 5 and 12;
127. compounds of subparagraphs 1, 5 and 13;
128. compounds of subparagraphs 1, 5 and 14;
129. compounds of subparagraphs 1, 6 and 12;
130. compounds of subparagraphs 1, 6 and 13;
131. compounds of subparagraphs 1, 6 and 14;
132. compounds of subparagraphs 1, 7 and 12;
133. compounds of subparagraphs 1, 7 and 13;
134. compounds of subparagraphs 1, 7 and 14;
135. compounds of subparagraphs 1, 8 and 12;
136. compounds of subparagraphs 1, 8 and 13;
137. compounds of subparagraphs 1, 8 and 14;
138. compounds of subparagraphs 2, 3 and 12;
139. compounds of subparagraphs 2, 3 and 13;
140. compounds of subparagraphs 2, 3 and 14;
141. compounds of subparagraphs 2, 4 and 12;
142. compounds of subparagraphs 2, 4 and 13;
143. compounds of subparagraphs 2, 4 and 14;
144. compounds of subparagraphs 2, 5 and 12;
145. compounds of subparagraphs 2, 5 and 13;
146. compounds of subparagraphs 2, 5 and 14;
147. compounds of subparagraphs 2, 6 and 12;
148. compounds of subparagraphs 2, 6 and 13;
149. compounds of subparagraphs 2, 6 and 14;
150. compounds of subparagraphs 2, 7 and 12;
151. compounds of subparagraphs 2, 7 and 13;
152. compounds of subparagraphs 2, 7 and 14;
153. compounds of subparagraphs 2, 8 and 12;
154. compounds of subparagraphs 2, 8 and 13;
155. compounds of subparagraphs 2, 8 and 14;
156. compounds of subparagraphs 3, 9 and 12;
157. compounds of subparagraphs 3, 9 and 13;
158. compounds of subparagraphs 3, 9 and 14;
159. compounds of subparagraphs 3, 10 and 12;
160. compounds of subparagraphs 3, 10 and 13;
161. compounds of subparagraphs 3, 10 and 14;
162. compounds of subparagraphs 3, 11 and 12;
163. compounds of subparagraphs 3, 11 and 13;
164. compounds of subparagraphs 3, 11 and 14;
165. compounds of subparagraphs 4, 9 and 12;
166. compounds of subparagraphs 4, 9 and 13;
167. compounds of subparagraphs 4, 9 and 14;
168. compounds of subparagraphs 4, 10 and 12;
169. compounds of subparagraphs 4, 10 and 13;
170. compounds of subparagraphs 4, 10 and 14;
171. compounds of subparagraphs 4, 11 and 12;
172. compounds of subparagraphs 4, 11 and 13;
173. compounds of subparagraphs 4, 11 and 14;
174. compounds of subparagraphs 5, 9 and 12;
175. compounds of subparagraphs 5, 9 and 13;
176. compounds of subparagraphs 5, 9 and 14;
177. compounds of subparagraphs 5, 10 and 12;
178. compounds of subparagraphs 5, 10 and 13;
179. compounds of subparagraphs 5, 10 and 14;
180. compounds of subparagraphs 5, 11 and 12;
181. compounds of subparagraphs 5, 11 and 13;
182. compounds of subparagraphs 5, 11 and 14;
183. compounds of subparagraphs 6, 9 and 12;
184. compounds of subparagraphs 6, 9 and 13;
185. compounds of subparagraphs 6, 9 and 14;
186. compounds of subparagraphs 6, 10 and 12;
187. compounds of subparagraphs 6, 10 and 13;
188. compounds of subparagraphs 6, 10 and 14;
189. compounds of subparagraphs 6, 11 and 12;
190. compounds of subparagraphs 6, 11 and 13;
191. compounds of subparagraphs 6, 11 and 14;
192. compounds of subparagraphs 7, 9 and 12;
193. compounds of subparagraphs 7, 9 and 13;
194. compounds of subparagraphs 7, 9 and 14;
195. compounds of subparagraphs 7, 10 and 12;
196. compounds of subparagraphs 7, 10 and 13;
197. compounds of subparagraphs 7, 10 and 14;
198. compounds of subparagraphs 7, 11 and 12;
199. compounds of subparagraphs 7, 11 and 13;
200. compounds of subparagraphs 7, 11 and 14;
201. compounds of subparagraphs 8, 9 and 12;
202. compounds of subparagraphs 8, 9 and 13;
203. compounds of subparagraphs 8, 9 and 14;
204. compounds of subparagraphs 8, 10 and 12;
205. compounds of subparagraphs 8, 10 and 13;
206. compounds of subparagraphs 8, 10 and 14;
207. compounds of subparagraphs 8, 11 and 12;
208. compounds of subparagraphs 8, 11 and 13;
209. compounds of subparagraphs 8, 11 and 14;
210. compounds of subparagraphs 1, 9 and 12;
211. compounds of subparagraphs 1, 9 and 13;
212. compounds of subparagraphs 1, 9 and 14;
213. compounds of subparagraphs 1, 10 and 12;
214. compounds of subparagraphs 1, 10 and 13;
215. compounds of subparagraphs 1, 10 and 14;
216. compounds of subparagraphs 1, 11 and 12;
217. compounds of subparagraphs 1, 11 and 13;
218. compounds of subparagraphs 1, 11 and 14;
219. compounds of subparagraphs 2, 9 and 12;
220. compounds of subparagraphs 2, 9 and 13;
221. compounds of subparagraphs 2, 9 and 14;
222. compounds of subparagraphs 2, 10 and 12;
223. compounds of subparagraphs 2, 10 and 13;
224. compounds of subparagraphs 2, 10 and 14;
225. compounds of subparagraphs 2, 11 and 12;
226. compounds of subparagraphs 2, 11 and 13;
227. compounds of subparagraphs 2, 11 and 14;
228. compounds of subparagraphs 1, 3, 9 and 12;
229. compounds of subparagraphs 1, 3, 9 and 13;
230. compounds of subparagraphs 1, 3, 9 and 14;
231. compounds of subparagraphs 1, 3, 10 and 12;
232. compounds of subparagraphs 1, 3, 10 and 13;
233. compounds of subparagraphs 1, 3, 10 and 14;
234. compounds of subparagraphs 1, 3, 11 and 12;
235. compounds of subparagraphs 1, 3, 11 and 13;
236. compounds of subparagraphs 1, 3, 11 and 14;
237. compounds of subparagraphs 1, 4, 9 and 12;
238. compounds of subparagraphs 1, 4, 9 and 13;
239. compounds of subparagraphs 1, 4, 9 and 14;
240. compounds of subparagraphs 1, 4, 10 and 12;
241. compounds of subparagraphs 1, 4, 10 and 13;
242. compounds of subparagraphs 1, 4, 10 and 14;
243. compounds of subparagraphs 1, 4, 11 and 12;
244. compounds of subparagraphs 1, 4, 11 and 13;
245. compounds of subparagraphs 1, 4, 11 and 14;
246. compounds of subparagraphs 1, 5, 9 and 12;
247. compounds of subparagraphs 1, 5, 9 and 13;
248. compounds of subparagraphs 1, 5, 9 and 14;
249. compounds of subparagraphs 1, 5, 10 and 12;
250. compounds of subparagraphs 1, 5, 10 and 13;
251. compounds of subparagraphs 1, 5, 10 and 14;
252. compounds of subparagraphs 1, 5, 11 and 12;
253. compounds of subparagraphs 1, 5, 11 and 13;
254. compounds of subparagraphs 1, 5, 11 and 14;
255. compounds of subparagraphs 1, 6, 9 and 12;
256. compounds of subparagraphs 1, 6, 9 and 13;
257. compounds of subparagraphs 1, 6, 9 and 14;
258. compounds of subparagraphs 1, 6, 10 and 12;
259. compounds of subparagraphs 1, 6, 10 and 13;
260. compounds of subparagraphs 1, 6, 10 and 14;
261. compounds of subparagraphs 1, 6, 11 and 12;

262. compounds of subparagraphs 1, 6, 11 and 13;
263. compounds of subparagraphs 1, 6, 11 and 14;
264. compounds of subparagraphs 1, 7, 9 and 12;
265. compounds of subparagraphs 1, 7, 9 and 13;
266. compounds of subparagraphs 1, 7, 9 and 14;
267. compounds of subparagraphs 1, 7, 10 and 12;
268. compounds of subparagraphs 1, 7, 10 and 13;
269. compounds of subparagraphs 1, 7, 10 and 14;
270. compounds of subparagraphs 1, 7, 11 and 12;
271. compounds of subparagraphs 1, 7, 11 and 13;
272. compounds of subparagraphs 1, 7, 11 and 14;
273. compounds of subparagraphs 1, 8, 9 and 12;
274. compounds of subparagraphs 1, 8, 9 and 13;
275. compounds of subparagraphs 1, 8, 9 and 14;
276. compounds of subparagraphs 1, 8, 10 and 12;
277. compounds of subparagraphs 1, 8, 10 and 13;
278. compounds of subparagraphs 1, 8, 10 and 14;
279. compounds of subparagraphs 1, 8, 11 and 12;
280. compounds of subparagraphs 1, 8, 11 and 13;
281. compounds of subparagraphs 1, 8, 11 and 14;
282. compounds of subparagraphs 2, 3, 9 and 12;
283. compounds of subparagraphs 2, 3, 9 and 13;
284. compounds of subparagraphs 2, 3, 9 and 14;
285. compounds of subparagraphs 2, 3, 10 and 12;
286. compounds of subparagraphs 2, 3, 10 and 13;
287. compounds of subparagraphs 2, 3, 10 and 14;
288. compounds of subparagraphs 2, 3, 11 and 12;
289. compounds of subparagraphs 2, 3, 11 and 13;
290. compounds of subparagraphs 2, 3, 11 and 14;
291. compounds of subparagraphs 2, 4, 9 and 12;
292. compounds of subparagraphs 2, 4, 9 and 13;
293. compounds of subparagraphs 2, 4, 9 and 14;
294. compounds of subparagraphs 2, 4, 10 and 12;
295. compounds of subparagraphs 2, 4, 10 and 13;
296. compounds of subparagraphs 2, 4, 10 and 14;
297. compounds of subparagraphs 2, 4, 11 and 12;
298. compounds of subparagraphs 2, 4, 11 and 13;
299. compounds of subparagraphs 2, 4, 11 and 14;
300. compounds of subparagraphs 2, 5, 9 and 12;
301. compounds of subparagraphs 2, 5, 9 and 13;
302. compounds of subparagraphs 2, 5, 9 and 14;
303. compounds of subparagraphs 2, 5, 10 and 12;
304. compounds of subparagraphs 2, 5, 10 and 13;
305. compounds of subparagraphs 2, 5, 10 and 14;
306. compounds of subparagraphs 2, 5, 11 and 12;
307. compounds of subparagraphs 2, 5, 11 and 13;
308. compounds of subparagraphs 2, 5, 11 and 14;
309. compounds of subparagraphs 2, 6, 9 and 12;
310. compounds of subparagraphs 2, 6, 9 and 13;
311. compounds of subparagraphs 2, 6, 9 and 14;
312. compounds of subparagraphs 2, 6, 10 and 12;
313. compounds of subparagraphs 2, 6, 10 and 13;
314. compounds of subparagraphs 2, 6, 10 and 14;
315. compounds of subparagraphs 2, 6, 11 and 12;
316. compounds of subparagraphs 2, 6, 11 and 13;
317. compounds of subparagraphs 2, 6, 11 and 14;
318. compounds of subparagraphs 2, 7, 9 and 12;
319. compounds of subparagraphs 2, 7, 9 and 13;
320. compounds of subparagraphs 2, 7, 9 and 14;
321. compounds of subparagraphs 2, 7, 10 and 12;
322. compounds of subparagraphs 2, 7, 10 and 13;
323. compounds of subparagraphs 2, 7, 10 and ;b 14;
324. compounds of subparagraphs 2, 7, 11 and 12;
325. compounds of subparagraphs 2, 7, 11 and 13;
326. compounds of subparagraphs 2, 7, 11 and 14;
327. compounds of subparagraphs 2, 8, 9 and 12;
328. compounds of subparagraphs 2, 8, 9 and 13;
329. compounds of subparagraphs 2, 8, 9 and 14;
330. compounds of subparagraphs 2, 8, 10 and 12;
331. compounds of subparagraphs 2, 8, 10 and 13;
332. compounds of subparagraphs 2, 8, 10 and 14;
333. compounds of subparagraphs 2, 8, 11 and 12;
334. compounds of subparagraphs 2, 8, 11 and 13;
335. compounds of subparagraphs 2, 8, 11 and 14.

The new compounds of this invention cannot be prepared by simple direct methods, and are therefore prepared by a multiple-step process. It would be expected that such compounds could be synthesized by the direct reaction of a substituted N-alkyl aniline with 2-chloro-3,5-dinitrobenzotrifluoride. Alternatively, one might expect to be able to prepare the corresponding N-H diphenylamine, and alkylate the nitrogen with alkyl iodide or a similar alkylating reagent. In fact, except for those compounds that have either the 2- or 6-position unsubstituted, neither process has been found to be operable. For the great majority of the compounds, one of the processes outlined below must be used.

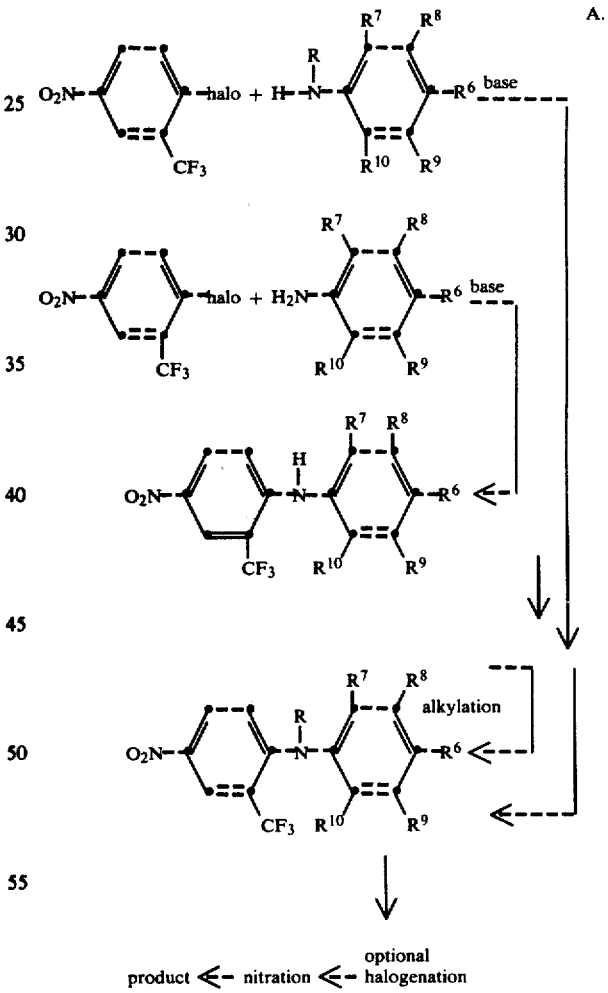

In the above formula, $R^6$, $R^7$, $R^8$, $R^9$ and $R^{10}$, respectively, have the values of $R^1$, $R^2$, $R^3$, $R^4$ and $R^5$, respectively, or any of them may represent hydrogen. The process may be carried out using a starting aniline which bears some or all of the desired $R^1$ through $R^5$ substituents of the product, or with an unsubstituted aniline, depending upon the substituents of the desired product. The halogen and nitro substituents of the aniline ring may be added at the end of the process. Thus, only any cyano, methyl or trifluoromethyl substituents of the aniline ring need be in place before the two rings are coupled. The final nitration step of the process above not only provides the 2-nitro group of the benzotrifluoride ring of the new compounds, but can also provide a nitro group on the aniline ring, when such a group is desired.

The term "halo" indicates that the benzotrifluoride ring may be substituted with any convenient halogen atom. Chlorine and bromine atoms are preferred, and chlorine is usually most convenient.

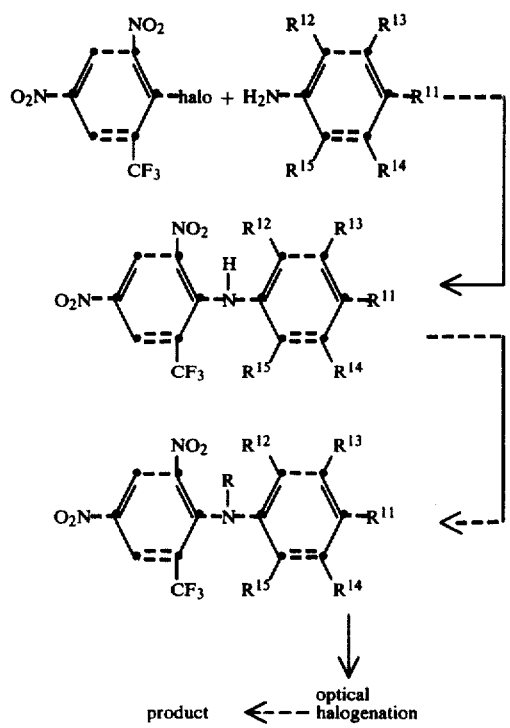

The alkylation step of process B above is sterically hindered by ortho substituents on the aniline ring. Accordingly, $R^{11}$, $R^{12}$, $R^{13}$, $R^{14}$ and $R^{15}$, respectively, have the values of $R^1$, $R^2$, $R^3$, $R^4$ and $R^5$, respectively, except that at least one of $R^{12}$ and $R^{15}$ represents hydrogen. It is preferable to use a starting aniline which has the cyano, nitro, methyl or trifluoromethyl substituents of the desired product, but lacks the halogen substituents, and to add the halogen atoms in final halogenation reactions. The coupling reactions which join the aniline and benzotrifluoride rings are most readily carried out at relatively low temperatures in the range of −20° to 10° in dimethylformamide in the presence of sodium hydride. Other media are likewise useful. The reactions may be carried out, for example, in alkanols such as ethanol, in which solvents the reaction temperature may be higher, in the range of 10° to 25°. Other solvents, including ketones such as acetone and methyl ethyl ketone and ethers including diethyl ether and tetrahydrofuran, are satisfactory reaction solvents.

In general, a strong base is needed to serve as acid scavenger. Sodium hydride, as mentioned above, is generally the most useful base, but other bases including inorganic bases such as sodium hydroxide and sodium carbonate, and organic tertiary amines such as pyridine and triethylamine, as well as a simple excess of the aniline starting compound, may be used.

Nitration of the benzotrifluoride ring has been readily accomplished with concentrated nitric acid in acetic acid solution at room temperature. The reaction is not an uncommon nitration, and may be accomplished with other common nitration reagents, such as a mixture of concentrated nitric and sulfuric acids at elevated temperatures. No solvent is used in the nitration reaction other than the acids themselves.

N-Alkylation of the diphenylamines is performed with reagents such as a dialkyl sulfate or an alkyl halide in the presence of an alkali metal carbonate. When a dialkyl sulfate is used, the preferred reaction solvent is acetone. Other solvents, such as tetrahydrofuran, dioxane and diethyl ether, are also useful, as are alkanes such as hexane and octane. Dimethylformamide is the preferred solvent for alkylations with alkyl halides, although acetone is also excellent. Other solvents as described above may be used.

The preferred bases for use in the alkylation reactions are sodium carbonate and potassium carbonate.

The amount of base used depends upon the reaction temperature. The higher the reaction temperature in the alkylation step, the greater excess of base is needed. When the reaction temperature is approximately ambient, a small excess of base should be used, such as 2 moles of base per mole of diphenylamine. When very high reaction temperatures such as 100° are used, a large excess of base should be used, in the range of 10-fold.

It will be recognized that it is important to avoid contamination of the alkylation reaction mixture with water.

In general, alkylations with dialkyl sulfates are best performed at about 80°, although temperatures from approximately room temperature to the reflux temperature may be used. Conditions close to room temperature, such as from 20° to 35°, are preferred for alkyl halide alkylations, but elevated temperatures up even to as high as 150° may be used.

Halogenation of the aniline ring is comparatively simple. Chlorinations are usually best performed with elemental chlorine in acetic acid, or in methylene chloride or the like halogenated solvent. Brominations are also readily carried out with elemental bromine in an acid medium, but such other typical brominating agents as N-bromosuccinimide and dibromoisocyanuric acid are also quite effective.

Iodination is best carried out with iodine monochloride as the reagent. Such iodinations are discussed, for example, by Ginsberg, J. Am. Chem. Soc. 75, 1107 (1953), and by Johnson et al., Org. Syn., Coll. Vol. 2, 343 (1943).

When a compound having no 4-substituent is to be made, it will often be necessary to block the 4-position before halogenating. It is most convenient to use a sulfonic acid as the blocking group, because it is readily added and readily removed. See, for example, Sandler and Karo, Organic Functional Group Preparations, 506-24 (Academic Press 1968); and Wagner and Zook, Synthetic Organic Chemistry, 15 (Wiley 1953).

The starting substituted anilines and phenyl halides are readily obtained by methods which are commonly known in the chemical literature. For the convenience of the chemist, the following references discussing the synthesis of substituted anilines are mentioned. Finger et al., J. Am. Chem. Soc. 81, 94-101 (1959); McBee et al., J. Am. Chem. Soc. 73, 3932-34 (1951); Finger et al., J.

*Am. Chem. Soc.* 73, 145–49 (1951); Bachman et al., *J. Am. Chem. Soc.* 69, 2022–25 (1947); Dains, *J. Am. Chem. Soc.* 52, 1573 (1930).

The trifluoromethyl-substituted anilines are best prepared, as chemists will recognize, by first obtaining a carboxylic acid-substituted aniline having the acid groups at the locations of the desired trifluoromethyls. The acid group is fluorinated with sulfur tetrafluoride according to the process of Hasek et al., Chemistry of Sulfur Tetrafluoride, *J. Am. Chem. Soc.* 82, 543–551 (1960).

It will be understood that the fluorinated aniline compounds are often prepared by first making a diazonium fluoroborate salt at the position where the fluorine atom is desired. The salt is then decomposed with heat to leave a fluorine atom at the desired position. Alternatively, it has recently been found that fluorine atoms may be inserted in phenyl rings with elemental fluorine at very low temperatures.

The following examples, showing the preparation of typical compounds of the invention, are presented to assure that organic chemists can easily obtain any desired compound. The products of the examples were identified by nuclear magnetic resonance analysis, elemental microanalysis, thin-layer chromatography, and in some instances, by mass spectrophotometry and infrared analysis.

EXAMPLE 1

2,4,6-trichloro-N-ethyl-2',4'-dinitro-6'-trifluoromethyldiphenylamine

A 3.5 g. portion of sodium hydride, obtained as an oil dispersion, was washed with petroleum ether and placed in a flask with 20 ml. of anhydrous dimethylformamide. The suspension was cooled to about −10° and the flask was blanketed with nitrogen. A solution of 8 g. of N-ethyl-2,4,6-trichloroaniline in 20 ml. of anhydrous dimethylformamide was added over a 5-minute period, and the mixture was stirred for 1 hour, holding the temperature constant. A solution of 8.1 g. of 2-chloro-5-nitrobenzotrifluoride in 20 ml. of diimethylformamide was then added over a 5-minute period, and the complete mixture was stirred for 6 hours while the temperature was allowed to rise to ambient. The mixture was then poured over ice and brought to a total volume of about 1 liter with water. The resulting precipitate was separated by filtration, and washed with pentane to obtain 7.7 g. of 2,4,6-trichloro-N-ethyl-4'-nitro-2'-trifluoromethyldiphenylamine.

Two g. of the above intermediate was warmed with 15 ml. of acetic acid until it dissolved. The solution was cooled to room temperature, and 5 ml. of concentrated nitric acid was added dropwise over a 10-minute period. The reaction mixture was then stirred at room temperature. After 2 days, the reaction mixture was quenched with a large amount of water, and the precipitate was separated by filtration and purified by column chromatography over silica gel with toluene as the eluent. Evaporation of the product-containing fractions produced 0.2 g. of pure 2,4,6-trichloro-N-ethyl-2',4'-dinitro-6'-trifluoromethyldiphenylamine, an oil, NMR peaks at 1.23, 4.01, 7.38, 8.55 and 8.76 ppm.

EXAMPLE 2

2,4,6-trichloro-N-methyl-2',4'-dinitro-6'-trifluoromethyldiphenylamine

Ten g. of 2,4,6-trichloro-N-methylaniline was reacted with 11 g. of 2-chloro-5-nitrobenzotrifluoride according to the process above, except that the temperature was room temperature and the reaction time was about 2 hours. Five g. of 2,4,6-trichloro-N-methyl-4'-nitro-2'-trifluoromethyldiphenylamine was recovered and nitrated according to the process of Example 1. The process yielded 2 g. of pure product, m.p. 125°–126° C.

|    | Theoretical | Found  |
|----|-------------|--------|
| C  | 37.80%      | 37.98% |
| H  | 1.57        | 1.54   |
| N  | 9.45        | 9.52   |
| Cl | 23.96       | 24.05  |

EXAMPLE 3

2,4-dibromo-N-methyl-2',4'-dinitro-6'-trifluoromethyldiphenylamine

A 27 g. portion of 2-chloro-3,5-dinitrobenzotrifluoride was added to 20 g. of aniline and 75 ml. of ethanol. After brief stirring at room temperature, the reaction mixture was seeded with a small sample of the desired intermediate product, and a precipitate formed immediately. The precipitate was separated by filtration and identified as 28.5 g. of 2,4-dinitro-6-trifluoromethyldiphenylamine.

The intermediate product was N-methylated in two different ways, both of which will be shown for the sake of clarity.

A. A 3.3 g. portion of the intermediate diphenylamine was taken up in 15 ml. of dimethylformamide, and 1.3 g. of sodium hydride was added. The mixture was stirred at room temperature, and 1.5 ml. of methyl iodide was added with the evolution of heat. After 1½ hours, another 2 ml. of methyl iodide was added, and the mixture was warmed slightly. After 2 hours more, the reaction mixture was added to a large amount of cold water, and the aqueous layer was decanted. The remaining oil was taken up in diethyl ether and stirred with magnesium sulfate and charcoal. After the solids were filtered away, the solution was evaporated to dryness to produce 2.4 g. of a dark red oil, which solidified upon cooling. The solid was heated with petroleum ether, cooled and filtered to produce 2.4 g. of N-methyl-2,4-dinitro-6-trifluoromethyldiphenylamine, m.p. 84°–86°.

B. Eleven g. of the intermediate diphenylamine was combined with 45 ml. of dioxane, 14 g. of sodium carbonate and 6 ml. of dimethyl sulfate and stirred at reflux temperature for 24 hours. Twelve ml. of additional dimethyl sulfate and 10 g. of sodium carbonate were then added, and the mixture was stirred at reflux temperature for 2 hours more. It was then poured into water and stirred for 4 hours. The aqueous layer was then decanted and the residue was taken up in methylene chloride and filtered. The solute was identified as approximately 10 g. of crude N-methyl-2,4-dinitro-6-trifluoromethyldiphenylamine.

The methylene chloride solution obtained from paragraph B was brominated without further purification by the addition of excess elemental bromine. The solution was stirred and allowed to stand for 1 hour, and was washed with water and with sodium bisulfite solution. The organic solution was then filtered and evaporated to dryness, and the residue was recrystallized from ethanol to obtain 11 g. of 2,4-dibromo-N-methyl-2',4'-dinitro-6'-trifluoromethyldiphenylamine, m.p. 110°.

|   | Theoretical | Found |
|---|---|---|
| C | 33.70% | 33.95% |
| H | 1.62 | 1.86 |
| N | 8.42 | 8.52 |

EXAMPLE 4

2,4-dibromo-6-chloro-N-methyl-2',4'-dinitro-6'-trifluoromethyldiphenylamine

A 2.5 g. portion of the product of Example 3 was dissolved in 10 ml. of methylene chloride, and the solution was saturated with elemental gaseous chlorine. After standing for 2 hours, the solution was evaporated to dryness under vacuum and the residue was recrystallized from ethanol to produce 2.1 g. of product, m.p. 139°–41°.

|   | Theoretical | Found |
|---|---|---|
| C | 31.52% | 31.78% |
| H | 1.32 | 1.35 |
| N | 7.88 | 8.10 |

EXAMPLE 5

2,4,6-tribromo-N-methyl-2',4'-dinitro-6'-trifluoromethyldiphenylamine

A 2.5 g. portion of the product of Example 3 was dissolved in 25 ml. of diethyl ether and 1.5 ml. of concentrated sulfuric acid. The solution was stirred at room temperature while 0.7 g. of dibromoisocyanuric acid was added. After 30 minutes of stirring, another 0.7 g. of dibromoisocyanuric acid and 1.5 ml. of sulfuric acid were added, and the addition was repeated again after another 15 minutes of stirring. Five minutes after the last addition, the reaction mixture was diluted with 50 ml. of diethyl ether and filtered. The organic layer was washed three times with 10 percent sodium carbonate solution, dried over magnesium sulfate and evaporated to dryness. The residue was recrystallized from ethanol to produce 2.4 g. of 2,4,6-tribromo-N-methyl-2',4'-dinitro-6'-trifluoromethyldiphenylamine, m.p. 150°–151°.

|   | Theoretical | Found |
|---|---|---|
| C | 29.10% | 29.02% |
| H | 1.22 | 1.06 |
| N | 7.27 | 7.29 |

EXAMPLE 6

2,4,6-trichloro-2',4'-dinitro-N-propyl-6'-trifluoromethyldiphenylamine

A 5 g. portion of the diphenylamine intermediate prepared in the first step of Example 3 was alkylated with propyl iodide in 80 ml. of dimethylformamide in the presence of 20 g. of sodium carbonate. The reaction mixture was stirred at 110° for 72 hours. The intermediate product was recovered by quenching the reaction mixture with water, extracting with methylene chloride, and evaporating the solvent under vacuum. The residue was taken up in acetic acid and the solution was saturated with chlorine and stirred at reflux for 4 hours. The product was purified by quenching the mixture in water, extracting with methylene chloride, washing the extract with sodium bicarbonate solution and then with water, and finally chromatographing on a silica gel column with pentane:toluene, 5:1. The yield was 0.35 g. of 2,4,6-trichloro-2',4'-dinitro-N-propyl-6'-trifluoromethyldiphenylamine, an oily liquid.

|   | Theoretical | Found |
|---|---|---|
| C | 40.66% | 40.66% |
| H | 2.35 | 2.22 |
| N | 8.89 | 8.71 |
| Cl | 22.50 | 22.45 |

The utility of this invention has been investigated by administering the compounds to rodents in laboratory tests. The following reports of typical tests illustrate the outstanding rodenticidal efficacy of the compounds of this invention.

The first series of tests to be described were performed by mixing the compounds with an animal feed of cereal origin, and presenting the treated feeds to male albino rats of the Spraque-Dawley strain. The feed used had the following composition.

| Ingredient | Percent |
|---|---|
| Corn, Yellow, Ground | 42.3% |
| Oats, Ground | 10.0 |
| Wheat Middlings | 10.0 |
| Soybean Oil Meal, Solvent Extracted Dehulled, 50% | 18.0 |
| Skimmed Milk, Dried | 5.0 |
| Corn, Distillers Dried Solubles | 2.5 |
| Alfalfa Meal, Dehydrated, 17% | 2.5 |
| Whey, Whole Dried | 1.0 |
| Fish Meal with Solubles | 4.0 |
| Animal Fat, Beef Tallow | 2.0 |
| Dicalcium Phosphate, Feed Grade | 0.5 |
| Calcium Carbonate | 1.0 |
| Salt | 0.3 |
| Trace Mineral Premix | 0.2 |
| Vitamin Premix | 0.6 |
| Methionine Hydroxy Analog | 0.1 |
| Total | 100.0 |

Compounds of the invention were mixed with portions of the above feed in concentrations described in the data tables below. Control rats in each experiment were fed on the same, untreated feed.

A treatment group of 4 or 5 rats was exposed to each lot of treated feed, and was allowed unlimited feed and water. The rats were individually weighed at death or termination of each experiment, which ran for 10 days if the rats survived.

The tables below report the concentration of the compound in the feed, in parts per million parts of feed (ppm.), the number of days after starting the rats on treated feed when each rat died, and the weight change, positive or negative, of each rat during the 10-day experiment.

| Compound of Example 1, 25 ppm. | | |
|---|---|---|
| Rat No. | Day of Death | Weight Change |
| 1 | 5 | −64 g. |
| 2 | 4 | −38 g. |
| 3 | 3 | −35 g. |
| 4 | 4 | −53 g. |
| 5 | 4 | −44 g. |

| Compound of Example 2, 15 ppm. | | |
| --- | --- | --- |
| Rat No. | Day of Death | Weight Change |
| 1 | 5 | −43 g. |
| 2 | 4 | −42 g. |
| 3 | 3 | −37 g. |
| 4 | 3 | −28 g. |
| 5 | 3 | −37 g. |

| Compound of Example 3, 100 ppm. | | |
| --- | --- | --- |
| Rat No. | Day of Death | Weight Change |
| 1 | 6 | −61 g. |
| 2 | 7 | −76 g. |
| 3 | 5 | −72 g. |
| 4 | 5 | −68 g. |
| 5 | 5 | −58 g. |

The second series of tests to be described were performed in much the same way, except that the test animals were wild house mice (*Mus musculus*) and a different feed mixture was used. In these tests, the weight change of the animals was not recorded.

| Compound of Example 4, 50 ppm. | |
| --- | --- |
| Animal No. | Day of Death |
| 1 | 3 |
| 2 | 5 |
| 3 | 3 |
| 4 | 3 |
| 5 | 2 |

| Compound of Example 5, 50 ppm. | |
| --- | --- |
| Animal No. | Day of Death |
| 1 | 3 |
| 2 | 2 |
| 3 | 4 |
| 4 | 3 |
| 5 | 3 |

The excellent rodenticidal results produced by the compounds are obvious on the face of the data. It will be observed that the compounds are effective at very low concentrations. Further, it is most significant that the compounds kill the rats with certainty, but not immediately. As has been explained, a good rodenticide allows time for many or all of the rats or mice of a colony to consume the poison bait before animals begin to die. It is clear that the compounds of this invention, when used in proper concentrations, work in the desired sure, but delayed, manner.

In its most broad description, this invention provides a method of reducing a population of rats or mice which comprises supplying to a locus frequented by the rats or mice a rodenticidally-effective amount of a rodenticidal composition which comprises an effective rodenticidal concentration of a compound described above. The invention also provides the rodenticidal compositions which comprise inert carriers and effective rodenticidal concentrations of the compounds described above.

The details of the method, such as the times and placed in which the rodenticidal compositions are supplied, and the carriers of the rodenticidal compositions, are common to the rodenticidal art. Some explanation of the various ways in which the method is carried out will be presented, however, for the convenience of the reader.

The method is effective in the control of rats and mice in general. For example, such pestiferous species as the following are controlled by the proper use of the present invention.

House mouse (*Mus musculus*)
Norway rat (*Rattus norvegicus*)
Black rat (*R. rattus rattus*)
Roof rat (*R. r. frugivorus*)
White-footed mouse (*Peromyscus leucopus*)
Pack rat (*Neotoma cinerea*)
Meadow mouse (*Microtus pennsylvanicus*)

Those skilled in the rodenticidal art will understand that the present invention can also be used for the control of rodents other than rats and mice. Since rodents other than rats and mice are frequently beneficial, the control of such other rodents is not contemplated as a regular part of the benefit of this invention. However, should the control of other rodents be desirable in particular circumstances, the invention can be used therefor.

This invention effectively controls rats and mice by both acute and chronic toxicity techniques. Proper adjustment of the concentration of the compound in the rodenticidal composition, as those of skill in the art will understand, allows the invention to reduce a population of rats or mice either by immediately poisoning the animals, or by chronically poisoning them over a number of feedings.

As has been explained, however, the delayed lethal effect of the compounds taught herein is an important factor in their rodenticidal usefulness. The maximum benefit of this invention is obtained by supplying to the locus of the rats or mice a rodenticidal composition which contains a concentration of the compound which is not acutely lethal in a single feeding, but which contributes to a lethal effect in the course of at least two feedings, and preferably a larger number of feedings. Accordingly it is also preferred to supply a sufficiently large amount of the rodenticidal composition to allow all the members of the population to feed on the composition two or more times.

A rat consumes about 5 to 50 grams of food per day; a mouse consumes about 1 to 5 grams per day, depending in each case on the animal's age, size, and state of health. A pest control specialist can estimate the number of animals in a colony, and can supply to the locus of the animals appropriate quantities of treated feed, or other compositions, to provide an effective amount for each animal.

A preferred embodiment of the invention is, therefore, a method for reducing a population of rats or mice which comprises supplying to a locus frequented by the rats or mice a sufficient quantity for two or more feedings of a rodenticidal composition which comprises a sufficient concentration of a compound described above to be effectively rodenticidal upon two or more feedings. Another preferred embodiment of the invention is the rodenticial composition just described.

Although the invention is described herein in terms of "feedings", the invention is also used by supplying rodenticidal compositions in the forms of tracking powders and drinking water compositions. It will be understood that such compositions are used in the same way as compositions based on foodstuffs, making appropriate adjustments to accommodate for the difference in the way the rodents ingest the compositions. The concentrations of the compounds in preferred drinking water or tracking powder compositions are effectively rodenticidal upon two or more waterings or cleanings, respectively. The term "feeding" is used herein to include watering and cleaning.

Rodenticidal compositions are based on inert carriers which include foodstuffs, drinking water and finely powdered solids. Compositions based on foodstuffs, which are the preferred inert carriers, may comprise any edible substance, since rats and mice are omnivorous. For example, such compositions may comprise cereals, meat byproducts or fats. Cereal foodstuffs which can be used in rodenticidal compositions include such substances as oatmeal, ground or cracked corn, soybean products, wheat and wheat byproducts, waste rice, and the like. Any grain can be the basis of such compositions. Sweetening and flavor-enhancing agents can also be added to increase the attraction of the bait.

Fatty rodenticidal bait compositions are regularly made in inert ingredients such as peanut butter, other nut butters, milk solids, animal fats, vegetable oils and the like. Rodenticidal compositions are also sometimes based on animal products such as bone meal and on meat products including animal byproducts.

Tracking powders are composed of rodenticidal compounds dispersed in powdered solids. Virtually any powder can be used, including talc, chalk, ground clays, flour, nut shell flour, and the like including powdered stone.

Rodenticidal compositions in drinking water comprise suspensions or dispersions of the compounds. The compounds are quite water-insoluble, and it is therefore normally necessary to grind the compound to a fine particle size and suspend it. Suspending agents are commonly used in the pharmaceutical art, and are chosen from among the thickeners, such as carboxymethylcellulose,, polyvinylpyrrolidone, gelatin and the alginates, and the surfactants, such as lecithin, alkylphenol polyethylene oxide adducts, alkyl sulfates, naphthalenesulfonates, alkylbenzenesulfonates and the polyoxyethylene sorbitan esters. It is sometimes also possible to use silicone antifoams, glycols, sorbitol and sugars as suspending agents.

The time when a rodenticidal composition of this invention is supplied to the locus of a colony of rats or mice is not critical. There are no seasons when a rodent colony is particularly susceptible, or relatively immune, to the use of rodenticides. It is usually advantageous first to pre-bait the colony with an untreated composition. Preferably, sufficient of the treated composition should be supplied to last for the time during which the members of the colony feed at least twice.

The concentration of the compound in the composition depends on the identity of the compound chosen, since they are of different potencies, upon the rapidity with which the population is desired to be reduced, and upon other factors as well. For example, if the population can be isolated, so that its only food or water source is a rodenticidal composition, the concentration obviously should be lower than if a variety of food sources are available. In general, rodenticidal compositions should contain concentrations from 5 to about 2000 parts per million parts of the composition (ppm.). More preferably, concentrations from about 10 to about 500 ppm. should be used, although it will be understood that amounts both above and below the named range will be effective and even desirable in unusual circumstances.

It will be understood that additives and attractants can be usefully included in rodenticidal compositions of this invention. Such additives as, for example, odorants, sex hormones, and flavoring agents are regularly used in rodenticidal compositions, and can usefully be used in the compositions of this invention to assist in breaking down the suspicion of the rodents.

I claim:

1. A compound of the formula:

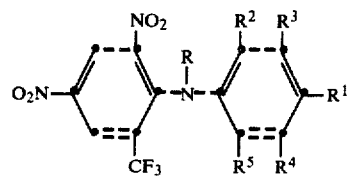

wherein

R represents methyl, ethyl or propyl;

$R^1$ represents hydrogen, fluoro, chloro, bromo, iodo, cyano, methyl, nitro or trifluoromethyl;

$R^2$ and $R^5$ independently represent hydrogen, fluoro, chloro, bromo, nitro, methyl or trifluoromethyl, provided that no more than one of $R^2$ and $R^5$ represents nitro;

$R^3$ and $R^4$ independently represent hydrogen, methyl, fluoro, chloro, bromo or trifluoromethyl;

provided that (a) no more than one of $R^1$, $R^2$, $R^3$, $R^4$ and $R^5$ represents methyl, except that $R^3$ and $R^4$ may both represent methyl;

(b) when $R^1$, $R^2$, $R^3$, $R^4$ or $R^5$ represents methyl or fluoro, two or three of $R^1$, $R^2$ and $R^5$ represent chloro or bromo;

(c) no more than one of $R^1$, $R^2$, $R^3$, $R^4$ and $R^5$ represents trifluoromethyl, except that $R^3$ and $R^4$ may both represent trifluoromethyl;

(d) when $R^2$ or $R^5$ represents trifluoromethyl, $R^1$ represents chloro or bromo;

(e) when one and only one of $R^3$ and $R^4$ represents trifluoromethyl, two or three of $R^1$, $R^2$ and $R^5$ represent chloro or bromo;

(f) no more than four of $R^1$, $R^2$, $R^3$, $R^4$ and $R^5$ represent hydrogen;

(g) two fluorine atoms are not adjacent to each other;

(h) when $R^2$ or $R^5$ represents nitro, $R^1$ represents chloro, bromo or nitro;

(i) when one of $R^1$, $R^2$, $R^3$, $R^4$ and $R^5$ represents trifluoromethyl, none of $R^1$, $R^2$, $R^3$, $R^4$ and $R^5$ represents fluoro or methyl.

2. A compound of claim 1 wherein $R^1$ represents hydrogen, fluoro, chloro, bromo, iodo, cyano, nitro or trifluoromethyl.

3. A compound of claim 2 wherein $R^2$ and $R^5$ independently represent hydrogen, fluoro, chloro, bromo, nitro or trifluoromethyl and R represents methyl or ethyl.

4. A compound of claim 3 wherein $R^3$ and $R^4$ independently represent hydrogen, fluoro, chloro, bromo or trifluoromethyl.

5. A compound of claim 4 wherein $R^1$ represents hydrogen, fluoro, chloro, bromo, nitro or trifluoromethyl.

6. The compound of claim 5 which is 2,4,6-trichloro-N-ethyl-2',4'-dinitro-6'-trifluoromethyldiphenylamine.

7. A compound of claim 5 wherein $R^2$ and $R^5$ independently represent hydrogen, chloro, bromo or fluoro and R represents methyl.

8. A compound of claim 7 wherein $R^1$ represents hydrogen, chloro or bromo.

9. The compound of claim 8 which is 2,4,6-trichloro-N-methyl-2',4'-dinitro-6'-trifluoromethyldiphenylamine.

10. The compound of claim 8 which is 2,4-dibromo-N-methyl-2',4'-dinitro-6'-trifluoromethyldiphenylamine.

11. The compound of claim 8 which is 2,4-dibromo-6-chloro-N-methyl-2',4'-dinitro-6'-trifluoromethyldiphenylamine.

12. The compound of claim 8 which is 2,4,6-tribromo-N-methyl-2',4'-dinitro-6'-trifluoromethyldiphenylamine.

13. The compound of claim 8 which is N-methyl-2,4-dinitro-3',5',6-tris(trifluoromethyl)diphenylamine.

14. The compound of claim 8 which is 2,6-dibromo-4-chloro-N-methyl-2',4'-dinitro-6'-trifluoromethyldiphenylamine.

15. The compound of claim 8 which is 4-bromo-2,6-dichloro-N-methyl-2',4'-dinitro-6'-trifluoromethyldiphenylamine.

16. A rodenticidal composition which comprises an inert carrier and an effective rodenticidal concentration of a compound of claim 1.

17. A composition of claim 16 wherein the concentration of the compound is from about 5 to about 2000 ppm.

18. A composition of claim 17 wherein the inert carrier is a foodstuff.

19. A composition of claim 18 wherein the concentration of the compound is from about 10 to about 500 ppm.

20. A composition of claim 16 wherein $R^1$ represents hydrogen, fluoro, chloro, bromo, iodo, cyano, nitro or trifluoromethyl.

21. A composition of claim 20 wherein $R^2$ and $R^5$ independently represent hydrogen, fluoro, chloro, bromo, nitro or trifluoromethyl and R represents methyl or ethyl.

22. A composition of claim 21 wherein $R^3$ and $R^4$ independently represent hydrogen, fluoro, chloro, bromo or trifluoromethyl.

23. A composition of claim 22 wherein $R^1$ represents hydrogen, fluoro, chloro, bromo, nitro or trifluoromethyl.

24. The composition of claim 23 wherein the compound is 2,4,6-trichloro-N-ethyl-2',4'-dinitro-6'-trifluoromethyldiphenylamine.

25. A composition of claim 23 wherein $R^2$ and $R^5$ independently represent hydrogen, chloro, bromo or fluoro and R represents methyl.

26. A composition of claim 25 wherein $R^1$ represents hydrogen, chloro or bromo.

27. The composition of claim 26 wherein the compound is 2,4,6-trichloro-N-methyl-2',4'-dinitro-6'-trifluoromethyldiphenylamine.

28. The composition of claim 26 wherein the compound is 2,4-dibromo-N-methyl-2',4'-dinitro-6'-trifluoromethyldiphenylamine.

29. The composition of claim 26 wherein the compound is 2,4-dibromo-6-chloro-N-methyl-2',4'-dinitro-6'-trifluoromethyldiphenylamine.

30. The composition of claim 26 wherein the compound is 2,4,6-tribromo-N-methyl-2',4'-dinitro-6'-trifluoromethyldiphenylamine.

31. The composition of claim 26 wherein the compound is N-methyl-2,4-dinitro-3',5',6-tris(trifluoromethyl)diphenylamine.

32. The composition of claim 26 wherein the compound is 2,6-dibromo-4-chloro-N-methyl-2',4'-dinitro-6'-trifluoromethyldiphenylamine.

33. The composition of claim 26 wherein the compound is 4-bromo-2,6-dichloro-N-methyl-2',4'-dinitro-6'-trifluoromethyldiphenylamine.

34. A composition of claim 19 wherein $R^1$ represents hydrogen, fluoro, chloro, bromo, iodo, cyano, nitro or trifluoromethyl.

35. A composition of claim 34 wherein $R^2$ and $R^5$ independently represent hydrogen, fluoro, chloro, bromo, nitro or trifluoromethyl and R represents methyl or ethyl.

36. A composition of claim 35 wherein $R^3$ and $R^4$ independently represent hydrogen, fluoro, chloro, bromo or trifluoromethyl.

37. A composition of claim 36 wherein $R^1$ represents hydrogen, fluoro, chloro, bromo, nitro or trifluoromethyl.

38. The composition of claim 37 wherein the compound is 2,4,6-trichloro-N-ethyl-2',4'-dinitro-6'-trifluoromethyldiphenylamine.

39. A composition of claim 37 wherein $R^2$ and $R^5$ independently represent hydrogen, chloro, bromo, or fluoro and R represents methyl.

40. A composition of claim 39 wherein $R^1$ represents hydrogen, chloro or bromo.

41. The composition of claim 40 wherein the compound is 2,4,6-trichloro-N-methyl-2',4'-dinitro-6'-trifluoromethyldiphenylamine.

42. The composition of claim 40 wherein the compound is 2,4-dibromo-N-methyl-2',4'-dinitro-6'-trifluoromethyldiphenylamine.

43. The composition of claim 40 wherein the compound is 2,4-dibromo-6-chloro-N-methyl-2',4'-dinitro-6'-trifluoromethyldiphenylamine.

44. The composition of claim 40 wherein the compound is 2,4,6-tribromo-N-methyl-2',4'-dinitro-6'-trifluoromethyldiphenylamine.

45. The composition of claim 40 wherein the compound is N-methyl-2,4-dinitro-3',5',6-tris(trifluoromethyl)diphenylamine.

46. The composition of claim 40 wherein the compound is 2,6-dibromo-4-chloro-N-methyl-2',4'-dinitro-6'-trifluoromethyldiphenylamine.

47. The composition of claim 40 wherein the compound is 4-bromo-2,6-dichloro-N-methyl-2',4'-dinitro-6'-trifluoromethyldiphenylamine.

48. A method of reducing a population of rats or mice which comprises supplying to a locus frequented by the rats or mice a rodenticidally-effective amount of a rodenticidal composition comprising an inert carrier and a rodenticidally-effective concentration of a compound of claim 1.

49. A method of claim 48 wherein the concentration of the compound is from about 5 to about 2000 ppm.

50. A method of claim 49 wherein the concentration of the compound is from about 10 to about 500 ppm.

51. A method of claim 48 wherein the concentration of the compound is rodenticidally effective upon two or more feedings, and the amount of the composition is sufficient for two or more feedings.

52. A method of claim 50 wherein the compound is a compound wherein $R^1$ represents hydrogen, fluoro, chloro, bromo, iodo, cyano, nitro or trifluoromethyl.

53. A method of claim 52 wherein the compound is a compound wherein $R^2$ and $R^5$ independently represent hydrogen, fluoro, chloro, bromo, nitro or trifluoromethyl and R represents methyl or ethyl.

54. A method of claim 53 wherein the compound is a compound wherein $R^3$ and $R^4$ independently represent hydrogen, fluoro, chloro, bromo or trifluoromethyl.

55. A method of claim 54 wherein the compound is a compound wherein $R^1$ represents hydrogen, fluoro, chloro, bromo, nitro or trifluoromethyl.

56. The method of claim 55 wherein the compound is 2,4,6-trichloro-N-ethyl-2',4'-dinitro-6'-trifluoromethyldiphenylamine.

57. A method of claim 55 wherein the compound is a compound wherein $R^2$ and $R^5$ independently represent hydrogen, chloro, bromo or fluoro and R represents methyl.

58. A method of claim 57 wherein the compound is a compound wherein $R^1$ represents hydrogen, chloro or bromo.

59. The method of claim 58 wherein the compound is 2,4,6-trichloro-N-methyl-2',4'-dinitro-6'-trifluoromethyldiphenylamine.

60. The method of claim 58 wherein the compound is 2,4-dibromo-N-methyl-2',4'-dinitro-6'-trifluoromethyldiphenylamine.

61. The method of claim 58 wherein the compound is 2,4-dibromo-6-chloro-N-methyl-2',4'-dinitro-6'-trifluoromethyldiphenylamine.

62. The method of claim 58 wherein the compound is 2,4,6-tribromo-N-methyl-2',4'-dinitro-6'-trifluoromethyldiphenylamine.

63. The method of claim 58 wherein the compound is N-methyl-2,4-dinitro-3',5',6-tris(trifluoromethyl)diphenylamine.

64. The method of claim 58 wherein the compound is 2,6-dibromo-4-chloro-N-methyl-2',4'-dinitro-6'-trifluoromethyldiphenylamine.

65. The method of claim 58 wherein the compound is 4-bromo-2,6-dichloro-N-methyl-2',4'-dinitro-6'-trifluoromethyldiphenylamine.

66. A method of claim 51 wherein the compound is a compound wherein $R^1$ represents hydrogen, fluoro, chloro, bromo, iodo, cyano, nitro or trifluoromethyl.

67. A method of claim 66 wherein the compound is a compound wherein $R^2$ and $R^5$ independently represent hydrogen, fluoro, chloro, bromo, nitro or trifluoromethyl and R represents methyl or ethyl.

68. A method of claim 67 wherein the compound is a compound wherein $R^3$ and $R^4$ independently represent hydrogen, fluoro, chloro, bromo or trifluoromethyl.

69. A method of claim 68 wherein the compound is a compound wherein $R^1$ represents hydrogen, fluoro, chloro, bromo, nitro or trifluoromethyl.

70. The method of claim 69 wherein the compound is 2,4,6-trichloro-N-ethyl-2',4'-dinitro-6'-trifluoromethyldiphenylamine.

71. A method of claim 69 wherein the compound is a compound wherein $R^2$ and $R^5$ independently represent hydrogen, chloro, bromo or fluoro and R represents methyl.

72. A method of claim 71 wherein the compound is a compound wherein $R^1$ represents hydrogen, chloro or bromo.

73. The method of claim 72 wherein the compound is 2,4,6-trichloro-N-methyl-2',4'-dinitro-6'-trifluoromethyldiphenylamine.

74. The method of claim 72 wherein the compound is 2,4-dibromo-N-methyl-2',4'-dinitro-6'-trifluoromethyldiphenylamine.

75. The method of claim 72 wherein the compound is 2,4-dibromo-6-chloro-N-methyl-2',4'-dinitro-6'-trifluoromethyldiphenylamine.

76. The method of claim 72 wherein the compound is 2,4,6-tribromo-N-methyl-2',4'-dinitro-6'-trifluoromethyldiphenylamine.

77. The method of claim 72 wherein the compound is N-methyl-2,4-dinitro-3',5',6'-tris(trifluoromethyl)diphenylamine.

78. The method of claim 72 wherein the compound is 2,6-dibromo-4-chloro-N-methyl-2',4'-dinitro-6'-trifluoromethyldiphenylamine.

79. The method of claim 72 wherein the compound is 4-bromo-2,6-dichloro-N-methyl-2',4'-dinitro-6'-trifluoromethyldiphenylamine.

* * * * *